May 18, 1943. S. FLAM 2,319,313
MOLDING APPARATUS
Filed March 8, 1938 3 Sheets-Sheet 1
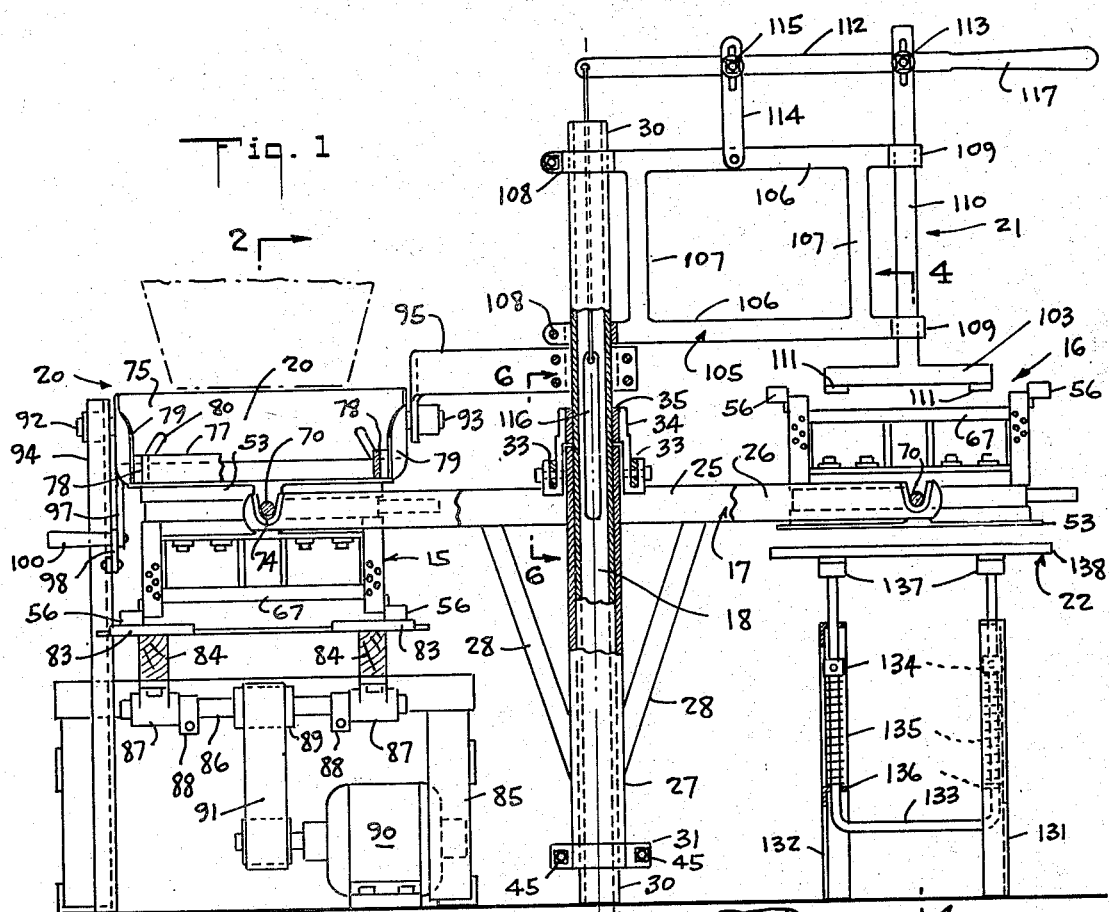
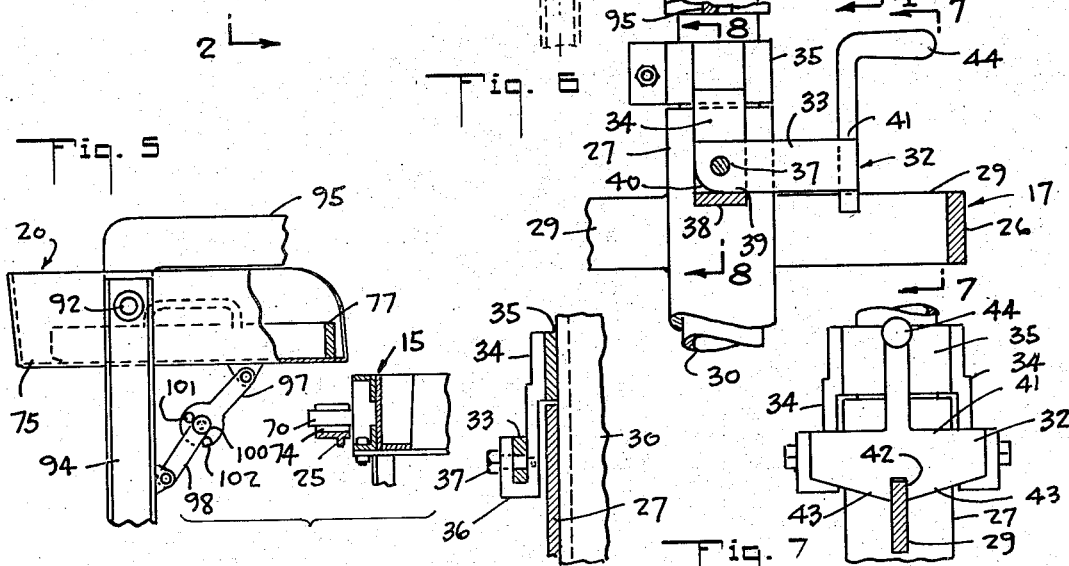
INVENTOR
Stephen Flam
BY John Flam
ATTORNEY May 18, 1943.  S. FLAM  2,319,313
MOLDING APPARATUS
Filed March 8, 1938  3 Sheets-Sheet 2
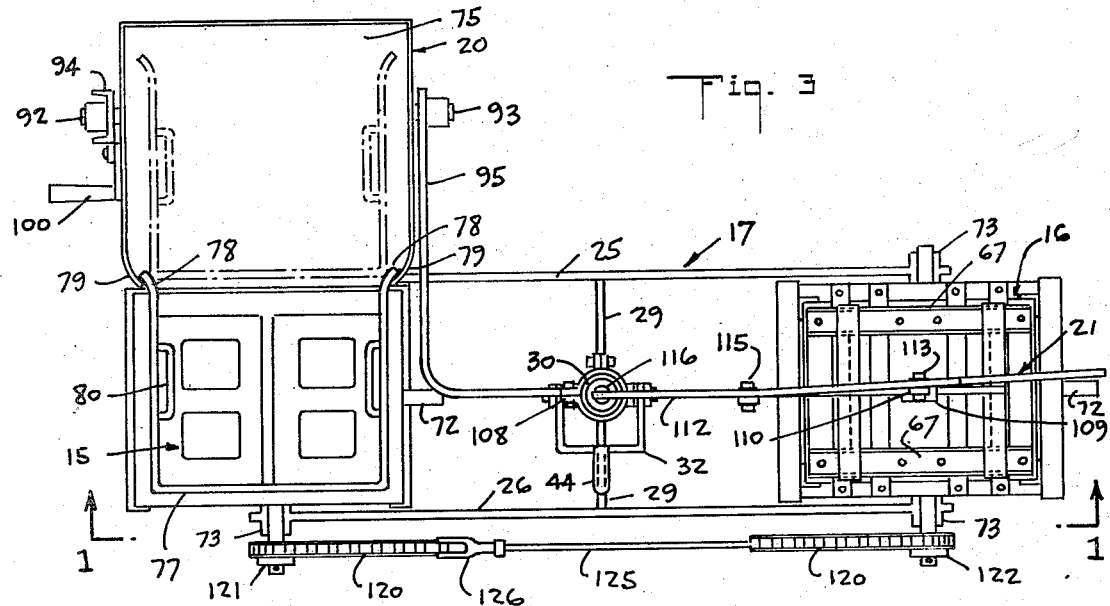
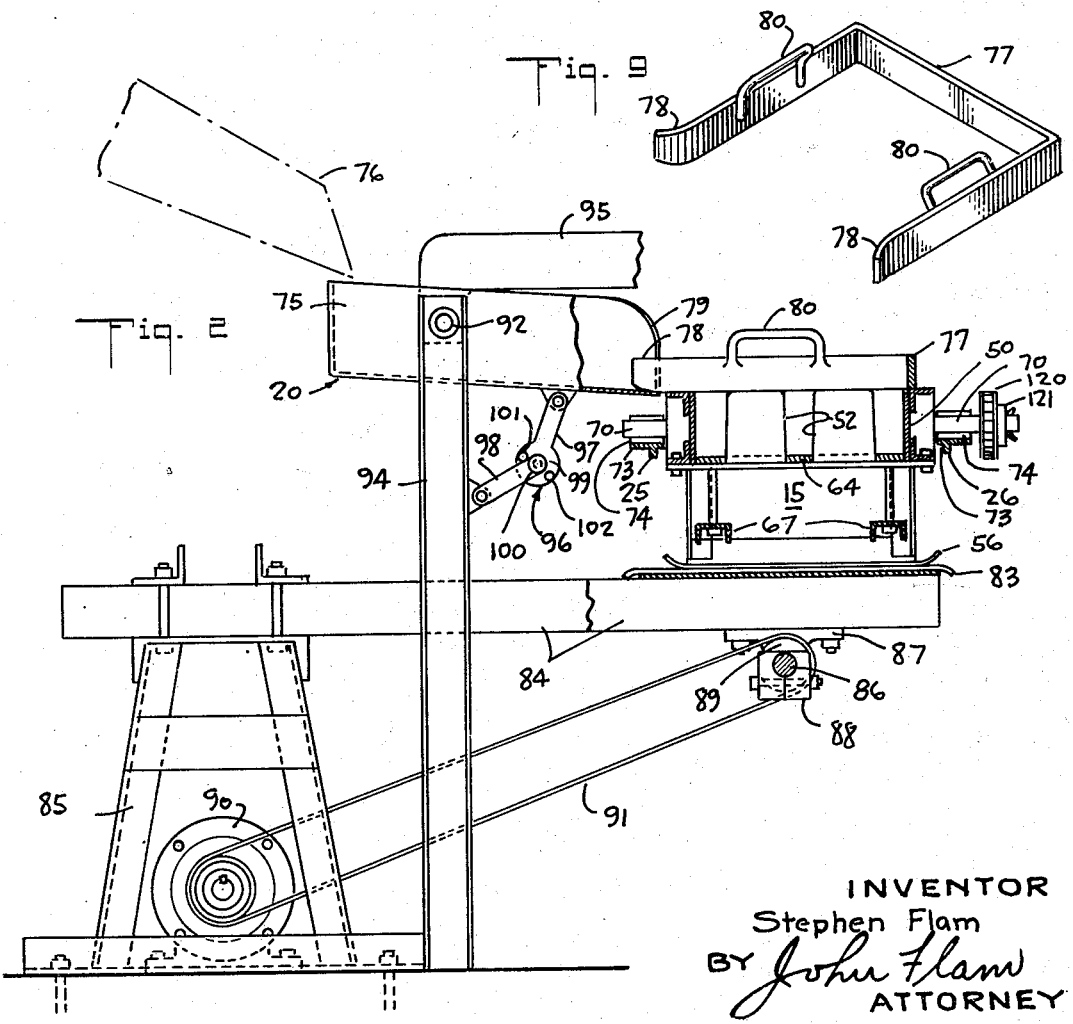
INVENTOR
Stephen Flam
BY John Flam
ATTORNEY

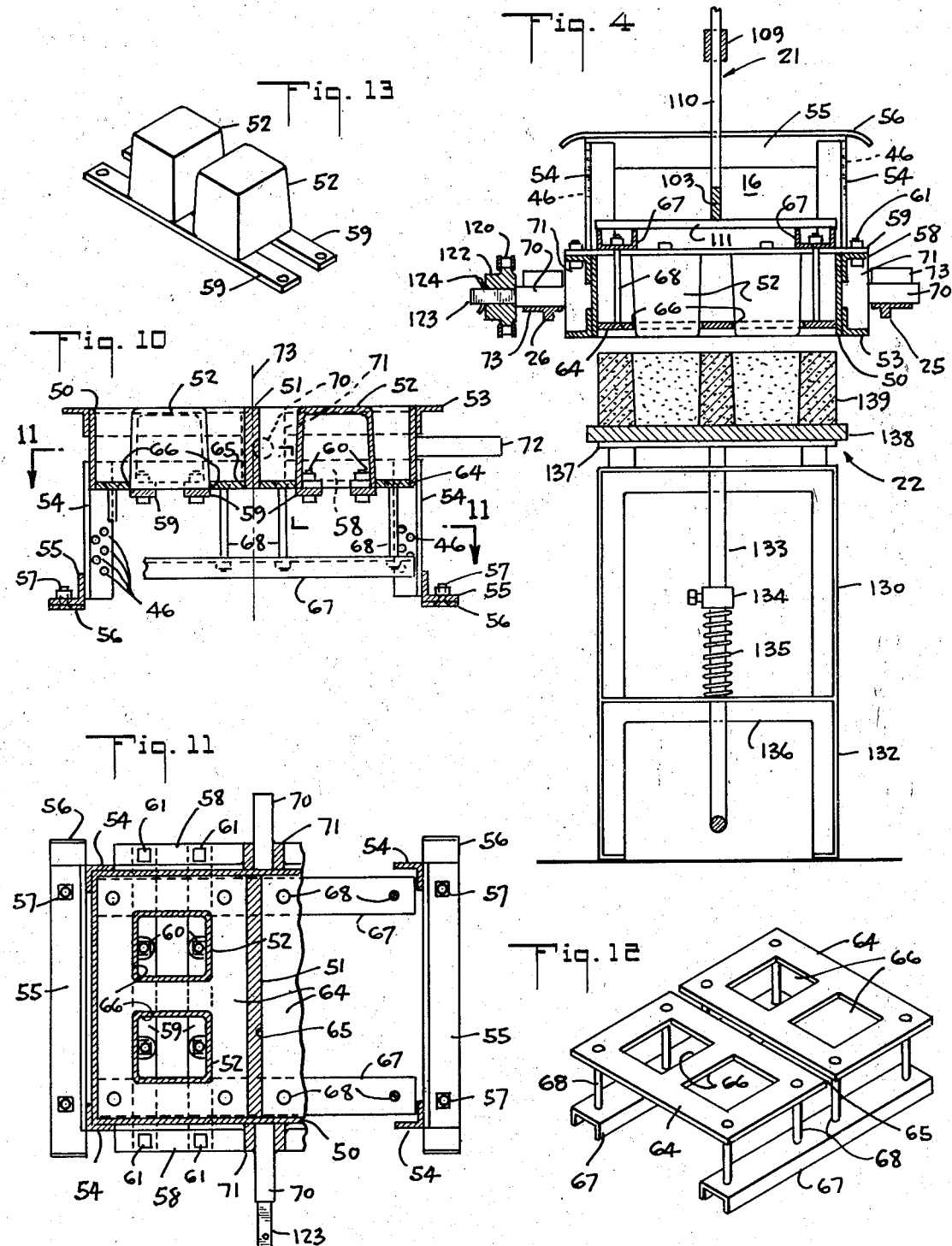

Patented May 18, 1943

2,319,313

UNITED STATES PATENT OFFICE 2,319,313

MOLDING APPARATUS

Stephen Flam, Sherman Oaks, Calif.

Application March 8, 1938, Serial No. 194,627

3 Claims. (Cl. 25—41)

This invention relates to molding of blocks, tile, brick, or slabs of any size, from plastic compositions such as cement or concrete.

Material of this character is usually cast in molds, from a hydraulic cement mixture. The mixture, in addition to cement, includes an aggregate which may be rock, gravel or cinders, pumice, or other light weight material in suitable combinations. Sufficient water is added to provide for the setting of the materials.

In molding blocks in very large quantities, attempts have been made so to correlate the apparatus and the workers employed, as to ensure that no material portion of time is wasted by any men while waiting for others to catch up; and also to ensure that substantially full time or continuous use is required of all parts of the equipment, such as the concrete mixer and the mold vibrator.

It is one of the objects of this invention to make it possible to coordinate the apparatus and the men employed in such manner that they operate with less wasted time.

In order to accomplish these results, use is made of a mold support that is arranged to position an empty mold adjacent a filling or casting station, and subsequently to position it to a stripping station.

It is another object of this invention to make it possible to effect the casting and stripping acts rapidly and effectively.

It is still another object of this invention to make it possible to cast blocks in a mold while simultaneously another mold is being stripped.

It is still another object of this invention to provide a novel mold structure, and especially adapted to facilitate stripping.

It is a still further object of this invention to provide a mold structure with which it is possible to cast blocks of different thicknesses.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a front elevation of the machine as seen on plane 1—1 of Fig. 3;

Fig. 2 is an enlarged cross section as seen on plane 2—2 of Fig. 1;

Fig. 3 is a plan view of the machine;

Fig. 4 is a cross section as seen on plane 4—4 of Fig. 1, certain parts of the mechanism being in positions corresponding to a different step in the operation of the machine;

Fig. 5 is a fragmentary view, similar to Fig. 2, showing the alternative position of the hopper;

Fig. 6 is an enlarged detail section, as seen on plane 6—6 of Fig. 1;

Figs. 7 and 8 are detail sections as seen on correspondingly numbered planes of Fig. 6;

Fig. 9 is an isometric view of the block leveller;

Fig. 10 is a longitudinal section of the mold, taken on a central plane;

Fig. 11 is a horizontal section taken along plane 11—11 of Fig. 10; and

Figs. 12 and 13 are isometric detail views of certain parts of the mold.

In the drawings, the mold structures 15 and 16 (Figs. 1 and 3) are shown as providing mold spaces for the molding of one or more blocks, bricks, slabs, or tiles from plastic material, such as concrete or cement of appropriate proportions. These molds are supported respectively at the opposite ends of a substantially horizontal frame or double ended yoke 17 (Fig. 3), which is supported so as to be revoluble about a central vertical axis 18. Thus a revolution of the frame through an angle of 180° will cause an interchange in the position of the molds 15, 16. By the provision of suitable charging and stripping apparatus this feature enables the provision of a machine in which the filling of one mold and stripping of the other mold may proceed simultaneously.

At the left hand side of the machine as seen in Figs. 1 and 3 and associated with mold 15, there is a hopper 20 for filling the molds while they are in the position of mold 15. At the right hand side, the mechanism 21 (Fig. 1) is provided for stripping the formed material, such as blocks, bricks, slabs or tiles, from the other mold 16 onto a suitable receiving table or pallet 22. By providing two operators, one stationed adjacent the hopper 20, and the other adjacent the stripping mechanism 21, mold 15 can be filled at the same time as the formed blocks, previously molded, are being stripped from mold 16. When these operations are completed, frame 17 is revolved through 180°, bringing mold 16 in position to be filled and mold 15 in position to be stripped. After the operations of filling mold 16 and of emptying mold 15 are completed, the frame is again turned through half a revolution and the filling and stripping operations are repeated.

It is possible to operate the machine with only one mold, in which case the frame 17 does not necessarily have to be turned through a half revolution between the filling and stripping operations, but may turn through a lesser angle, the stripping mechanism 21 and receiving mechanism 22 being appropriately placed.

Frame 17 includes a pair of substantially parallel horizontal members or sides 25 and 26 (Figs. 1, 2, 3 and 4) secured to a center tube or pipe 27 by means of diagonal braces 28 and cross pieces 29. These braces 29 converge from the sides 25, 26, onto the tubular support or pipe 27. This pipe closely surrounds a fixed column 30, which may conveniently be another pipe of suitable size to telescope within pipe 27, and which is fixed in any convenient way to the foundation of the machine. Pipe 30 thus forms a vertical pivot for frame 17.

A split collar 31 is clamped in position on pipe 30 near its lower end by means of bolts 45, and serves to support pipe 27, which is rotatable about pipe 30. Thus, the entire frame 17 is rotatably supported by the stationary pipe 30, and its vertical position may be varied by shifting collar 31. In this way, the required height of the molds 15 and 16 for proper operation may be readily accomplished.

In order to hold frame 17 against undesired rotation, as well as to position it when stationary so as to support the molds in the desired relationship to the rest of the machine, a latch 32 is provided which cooperates with cross members 29, best shown in Figs. 1, 3, 6, 7 and 8. Latch 32 comprises a U-shaped member having legs 33 embracing the central pipe 27 and pivotally supported on pipe 30 by lugs 34 secured to opposite sides of a collar 35. This collar is adjustably secured to column 30 adjacent the upper end of pipe 27 in any convenient way, as by being clamped about it. Thus it may be raised or lowered to accommodate changes in the height of pipe 27 and frame 17. Each of lugs 34 terminates at its lower end in a narrow U-shaped portion 36, the opposite sides of which embrace one of legs 33 of latch 32. Shoulder studs 37 serve to pivotally secure the legs 33 in position. Since, as will presently appear, it is necessary that the latch 32 be free to move upward from the horizontal position shown, but that it be prevented from falling below that position, the horizontal part 38 of lug 34 engages the lower edge of leg 33, as shown at 39 in Fig. 6. This keeps the latch from dropping below the position indicated. To permit it to be swung upward about its pivots, the back lower corners of legs 33 are ground off or otherwise removed, as indicated at 40.

By referring to Fig. 7 it will be seen that the portion 41 of latch 32 connecting legs 33, has a central notch 42 to engage cross piece 29, the lower surface of portion 41 sloping upwardly from the notch to each leg, as indicated by 43. Gravity may be used to cause latch 32 to engage the cross piece 29. When it is desired to revolve the frame 17, latch 32 is lifted by means of handle 44, sufficiently to free notch 42 from cross piece 29. When the frame has been turned sufficiently to prevent re-engagement of the cross piece and the notch, the latch may be released, the lugs 34 maintaining it in a horizontal position as previously explained. As the cross piece 29 on the opposite side of the frame approaches the latch, its upper surface will engage one of the inclined surfaces 43, raising the latch until member 29 is below notch 42, when the latch will drop by gravity, causing the notch to engage the member and checking further movement of the frame 17. By this means the frame will always be stopped with its ends correctly positioned.

For successful use of a machine of this type, a mold from which the formed article may be easily stripped is required. Such a mold is disclosed herein, the details being shown in Figs. 10-13 inclusive. This mold is of the type having a movable bottom, and in which the entire mold is inverted and the bottom pushed downwardly to strip the molded article.

Referring to Figs. 10 and 11, the mold includes a rectangular wall 50 which may be conveniently formed of sheet metal. This rectangle may be appropriately divided by walls of the same or different material into spaces corresponding to the size of blocks desired, and these spaces may be provided with cores, if hollow blocks are wanted. As shown in this instance, the space within wall 50 is divided into halves by a transverse wall 51, and each half is provided with two cores 52 (Fig. 13). The manner in which these cores are supported in the mold structure will be hereinafter described. This particular mold is capable of forming a pair of blocks or tile, each block having two cored spaces in it.

The upper edge of wall 50 is re-enforced by a light angle iron 53 secured to it as by welding, and forming a top flange for the mold. Depending from each corner of wall 50 is a short piece of angle iron forming a leg 54, the legs at opposite ends of the mold being joined by angle irons 55. A shoe or sled member 56 is removably secured to each angle iron 55 as by countersunk bolts 57. The mold is supported by the aid of these shoes while being filled (see Figs. 1 and 2). Secured to walls 50 on the opposite sides of the mold and adjacent the lower edge of the wall are angle irons 58. By referring to Figs. 10 and 13 it will be clear that a pair of the cores 52 are secured on flat strips 59, as by cap screws 60. These strips are then secured to angles 58, as by bolts 61 (Fig. 11).

The bottom of each half of the mold between walls 50 and 51 and cores 52 is closed by movable bottoms 64 (Fig. 12). These closely fit between the rectangular wall 50 and partition 51 (Fig. 12) and are spaced apart as shown at 65 to accommodate partition 51, and openings 66 to accommodate cores 52. The bottom plates 64 are assembled on a pair of parallel channel irons 67, being secured to them by spacer bolts 68, these having countersunk heads in the bottom plates 64.

When the mold is to be filled, the bottom mold is supported on top of bars 59, as shown in Fig. 10. When the mold is to be stripped, it is inverted and the bottom pressed downwardly until channels 67 are stopped by bars 59, as shown in Fig. 4. To assist the stripping operation the cores 52 may have a slight taper as indicated. The stripping action is also facilitated by the fact that no excess water is used in the mixture of cement or concrete. Thus the block 139 has sufficient rigidity to be self-supporting immediately after the molding operation.

By supporting bottoms 64 at different distances below the top of the mold, blocks of different thicknesses may be produced in the same mold. This may be done conveniently by providing a plurality of spaced holes 46 in corresponding legs of angle irons 54 on opposite sides of the mold (see Fig. 10). By raising the bottom assembly 64, 67, etc., and passing a long bolt through the appropriate holes in angle irons 54 at opposite ends of the mold, the bottom will be supported at the desired depth below the top of the mold since channels 67 will rest on the bolts. In other words, the bottom assembly under these conditions is not supported by bottom 64 resting on bars 59, but instead by members 67 resting on the bolts.

To support the mold in such a manner that it may be readily inverted, a trunnion 70 (Fig. 11) is provided on each side of the mold, being fixed in a block 71 which extends between the angle irons 53 and 58. A handle 72 is provided at one end of the mold by means of which it may be turned over. By referring to Fig. 10 it will be noted that the trunnion 70 is offset with respect to the center line 73 of the mold. Thus when the mold is unsupported except by the trunnion, it will tend to rotate in a counter-clockwise direction, which facilitates turning it by hand.

As a means of supporting the molds in frame 17, arms 25, 26 thereof are each provided with half bearings 73 (see Figs. 3 and 4) to receive trunnions 70.

It is obvious that for rapid production of blocks or tile, means for rapidly filling the molds, and tamping the material therein, as well as for stripping the finished block from the mold, must be provided.

For filling the mold a small hopper 75 (Figs. 1, 2 and 3) may be provided. This hopper may be supplied with the desired material by a chute 76 leading from the source of supply, such as a concrete mixer. Hopper 75 is supported so that its discharge end is flush with the top of the mold. A leveller 77 (Fig. 9), which has the same inside length as the mold, is placed so that the inside edge approximately coincides with the inside edge of the mold (Figs. 2 and 3). To facilitate proper positioning of the leveller, its side members are curved outwardly at 78, while the sides of the hopper are curved inwardly at 79. These curved portions cooperate to center the leveller and limits its outward movement. With the parts in the positions described, the mixed block material may be moved from the hopper to the mold by any convenient means, as for instance a short handled hoe; the leveller forming a wall around the mold to prevent spilling of the material. Other means by which the mold may be filled, such as an overhead chute, feeder box, or the like, will be obvious to those skilled in the art.

When the mold is filled, the leveller is pushed across the mold by means of handles 80 into hopper 75, where it occupies the position shown by the broken lines in Fig. 3, or as shown in Fig. 5. As it moves across the mold it scrapes off the excess material and returns it to the hopper 75.

To provide a homogeneous and dense block means are provided to impart vibration to the mold while it is being filled. Since the vibration imparted to the mold should not extend to other parts of the machine, provision is made so that when the mold is positioned adjacent the filling hopper, it is supported free of trunnions 70 and frame 17, by the aid of runners 56 which rest upon mold supporting plates 83. By referring to Fig. 1, it will be noted that the sides of bearing 73 diverge upwardly. Thus, when the mold is supported to provide clearance 74 between trunnion 70 and the bottom of the bearing (Figs. 1 and 2), there will also be clearance between the trunnion and the sides of the bearing, insuring that the trunnion is free of the bearing and that no vibration will be transmitted between them.

Plates 83 are supported adjacent the free ends of cantilever beams 84, which are preferably of hard wood and supported near their other ends by a frame work 85 (Figs. 1 and 2), and which are adapted to be vibrated by a mechanism now to be described. A shaft 86 is rotatably supported by bearings 87 attached below the free ends of beams 84. Shaft 86 carries eccentric weights 88 which are clamped in position on it so as to be angularly adjustable with respect to each other. A motor 90 rotates shaft 86 at high speed by means of belt 91 and pulley 89 on shaft 86 (Fig. 1). The unbalanced weights on shaft 86 impart an intense vibration to the unsupported ends of beams 84, and thence to the mold resting thereon. This type of vibrator forms the subject matter of Letters Patent No. 1,806,620 for Vibrator mechanism, issued to Stephen Flam on May 26, 1931.

To permit frame 17 to be revolved about its axis and to move the filled mold from the vibrating mold plate 83, the hopper 75 must be positioned to allow the mold to pass under it. One way in which this may be done is to pivotally support the hopper at a suitable height and provide means to raise and lower the forward end. Thus the hopper 75 is provided with pivots 92 and 93 on opposite sides (Figs. 1, 2 and 5), the former having a bearing supported by a vertical column 94, the latter having a bearing supported in bracket 95 extending from column 30. Toggle mechanism 96 (Figs. 2 and 5) may be used to support the hopper in either desired position. This mechanism includes a link 97 pivotally connected at one end to the hopper, and a link 98 pivotally connected at one end to the column 94. The other ends of these links are pinned together at 99 and a handle 100 is provided at this point. One of the links, as 97, may have the end where the links are connected enlarged, and stop pins 101 and 102 are mounted therein. With the hopper in its lower position (Fig. 2), the pin 101 engages the upper side of link 98, serving to support the hopper in this position. When it is desired to raise the hopper to its other position, handle 100 is moved upwardly to the left until it reaches the position of Fig. 5. The toggle is over center in this position, stop pin 102 engaging the lower side of link 98 and checking further movement, whereby the hopper is supported in this position.

As pointed out in the description of the mold, the mold is inverted when the molded blocks are to be stripped or removed from it. The mold 16 (Figs. 1 and 4) is so shown.

To strip the blocks from the mold, a force must be exerted on channels 67 to force the bottom 64 of the mold, together with the blocks, downwardly. This force is necessary because the molded blocks or tile, while wet, cling with tenacity to the walls of the mold and to the cores. This adhesion is great enough to permit an inversion of the filled molds without danger of the molded tile dropping out.

One way in which stripping pressure can be applied to channels 67 is by means of the stripping mechanism 21 (Figs. 1, 3 and 4). This may include a rectangular frame 105 formed of a pair of spaced parallel arms 106, joined by vertical members 107. One end of each arm 106 is provided with a clamp 108 by means of which the frame 105 may be secured in position on the column 30. The opposite end of each arm has a guide 109 formed on it, slidably to receive an inverted T-member 110. The cross arm 103 of member 110 is provided with lateral extensions 111 adapted to engage channels 67, as clearly shown in Fig. 4. It will be evident that downward movement of member 110 will be effective to move the channels 67 and bottoms 64 of mold 16 downwardly to the position indicated in Fig. 4. For imparting vertical movement to member 110, a pivot 113 is provided between lever 112 and member 110. A link 114 is pivotally mounted on the upper arm 106 of the frame and pivotally supports lever 112 by a suitable bolt or pin 115. A counterweight 116, which may be conveniently housed within column 30, is attached to the end of lever 112 opposite T-member 110 and serves to maintain this member in its upper position and free of the mold. When it is desired to remove the blocks from the mold the operator grasps handle 117 and pulls downwardly against the action of the counterweight 116. By the structure described this movement is effective to push the bottom 64 of the mold downwardly. When the handle is released, the counterweight returns the lever 112 and member 110 to their upper position. Of course, power means such as a hydraulic piston, for operating the lever 112, could be provided if desired.

The operation of the machine is simple and perhaps obvious from the foregoing description of the structure. During the filling operation, the mold trunnions 70 are free of the half-bearings 73. The motor 90 is operated to impart rapid vibration to the arms 84 that support the mold, during the time that the mold is being filled. Upon completion of the operation, leveller 77 is replaced in hopper 75 (Fig. 5) and the hopper is tilted to its upper position. Latch 32 is then raised to release frame 17, and the frame is moved about its axis 18, causing the mold to slide off mold plate 83. When it is free of the mold plate, it is supported by trunnions 70 in bearings 73 of the frame. It is now turned about these trunnions by the operator until it is upside down. At the same time the movement of the frame 17 continues until a half-revolution is completed, when the latch 32, dropping by gravity, checks further movement of the frame, and the mold occupies the position indicated by numeral 16 in Fig. 1. At the same time mold 16 has been turned over by the operator so as to be right side up, and has been carried by the frame 17 so that it rests on mold plate 83 ready to be filled. It will be noted by referring to Figs. 1 and 2, that when the mold is on the mold plate, trunnions 70 are absolutely free of the bearings 73 in the frame, as previously mentioned. Thus vibration from shaft 86, while readily imparted to the mold and its contents, does not reach frame 17 or any part of the machine.

Since, when two molds are used, only one mold is always inverted with respect to the other mold, the operation of the machine is rendered more simple by providing connecting mechanism between the molds 15 and 16 so that they may be turned simultaneously for positioning them for stripping and loading. This mechanism may conveniently consist of a chain 120 (Fig. 3) passing over sprockets 121 and 122 secured respectively to the trunnions of mold 15 and mold 16. Since it is desirable that these sprockets be readily removable, they may be accommodated on a square extension 123 of the trunnion and held in place by a cotter pin 124 (Fig. 4). Since the sprockets make but a half turn in each direction, a rod 125 (Fig. 3) may be substituted for the center portions of the chain. It is necessary that the relative angular positions of the molds be closely adjusted. Such adjustment may be had by providing means for adjusting the length of rod 125, as by threading a clevis 126 on one end of the rod.

Since it is desirable that the freshly formed block be not allowed to fall any substantial distance as it is pushed from the mold, means are provided for maintaining the pallet which is to receive the block, close to the mold, the weight of the block on the pallet being effective to move it away to permit the block to clear the mold. Referring to Figs. 1 and 4, a pallet stand 130 is provided which includes a pair of frames 131, 132 which slidably support a member 133 formed of a rod bent into a U-shape. Each frame receives one leg of this member, and each leg has a collar 134 secured on it which confines a compression spring 135 between it and a horizontal bar 136 in the frame. Each leg of member 133 has a pad 137 at its upper end adapted to have a wood pallet or light metal plate 138 rest on it. The springs 135 are effective to support pallet 138 closely upon the mold, as shown in Fig. 1. However, when blocks 139 (Fig. 4) are forced from the mold onto the pallet, the weight compresses the springs until the pads 137 rest on the frames. After the blocks have been placed on the pallet 138, the pallet and block are removed from the stand for appropriate further operations (such as placing them on a moving conveyor) and another empty pallet is placed on the stand.

What is claimed is:

1. In apparatus of the character described, means forming a vertical pivot, a mold supporting frame having oppositely extending portions, carried by said pivot, a pair of mold structures, pivotally supported on horizontal axes, respectively by said oppositely extending portions, and means for simultaneously rotating said mold structures about their axes, said mold structures being so supported that when one is inverted about its axis, the other is placed in suitable material receiving position.

2. In apparatus of the character described, a mold filling station, a movable mold support, a mold carried by the support, means forming a vibratory rest for the mold at the filling station, and means for so supporting the mold on said rest as to free the mold temporarily from the support during the vibration period.

3. In apparatus of the character described, a mold filling station, a movable mold support, a mold carried by the support, means forming a vibratory rest for the mold at the filling station, and means, operating upon movement of the mold support to the filling position, for freeing the mold from the support during the vibration period.

STEPHEN FLAM.